United States Patent [19]

Hall et al.

[11] 4,395,973

[45] Aug. 2, 1983

[54] CABLE HOLD-DOWN APPARATUS

[75] Inventors: Benjamin O. Hall, Oskaloosa, Iowa; Robert K. Foust, Connersville, Ind.

[73] Assignee: Intraco, Inc., Oskaloosa, Iowa

[21] Appl. No.: 180,139

[22] Filed: Aug. 21, 1980

[51] Int. Cl.³ ............... A01K 39/012; A01K 39/014; B65G 19/28

[52] U.S. Cl. ..................... 119/51 CF; 119/52 AF; 198/735

[58] Field of Search ............... 198/717, 725, 727, 729, 198/728, 734, 735, 716; 119/51 CF, 52 AF

[56] References Cited

U.S. PATENT DOCUMENTS 3,101,070  8/1963  Cordis ................................ 119/52

FOREIGN PATENT DOCUMENTS 935818  12/1955  Fed. Rep. of Germany .
208653   9/1959  Fed. Rep. of Germany .
2134239  1/1973  Fed. Rep. of Germany ...... 198/735

Primary Examiner—Harold D. Whitehead
Assistant Examiner—Douglas D. Watts
Attorney, Agent, or Firm—Henderson & Sturm

[57] ABSTRACT

A conveying system of a type including a flexible endless member and circular material engaging inserts disposed on the flexible endless member are provided for catching material and moving the material in response to movement of the endless flexible member and the material engaging inserts. A channel is disposed at least partially around the flexible endless member and the material engaging inserts for confining material for transportation from place to place. A drive unit is provided for selectively causing the flexible endless member to be pulled through the channel. The channel has a pair of opposed sidewalls, a bottom wall and structure integrally formed in and connected to an upper portion of the pair of opposed sidewalls for holding the circular material engaging inserts and the flexible endless member in the channel.

5 Claims, 5 Drawing Figures

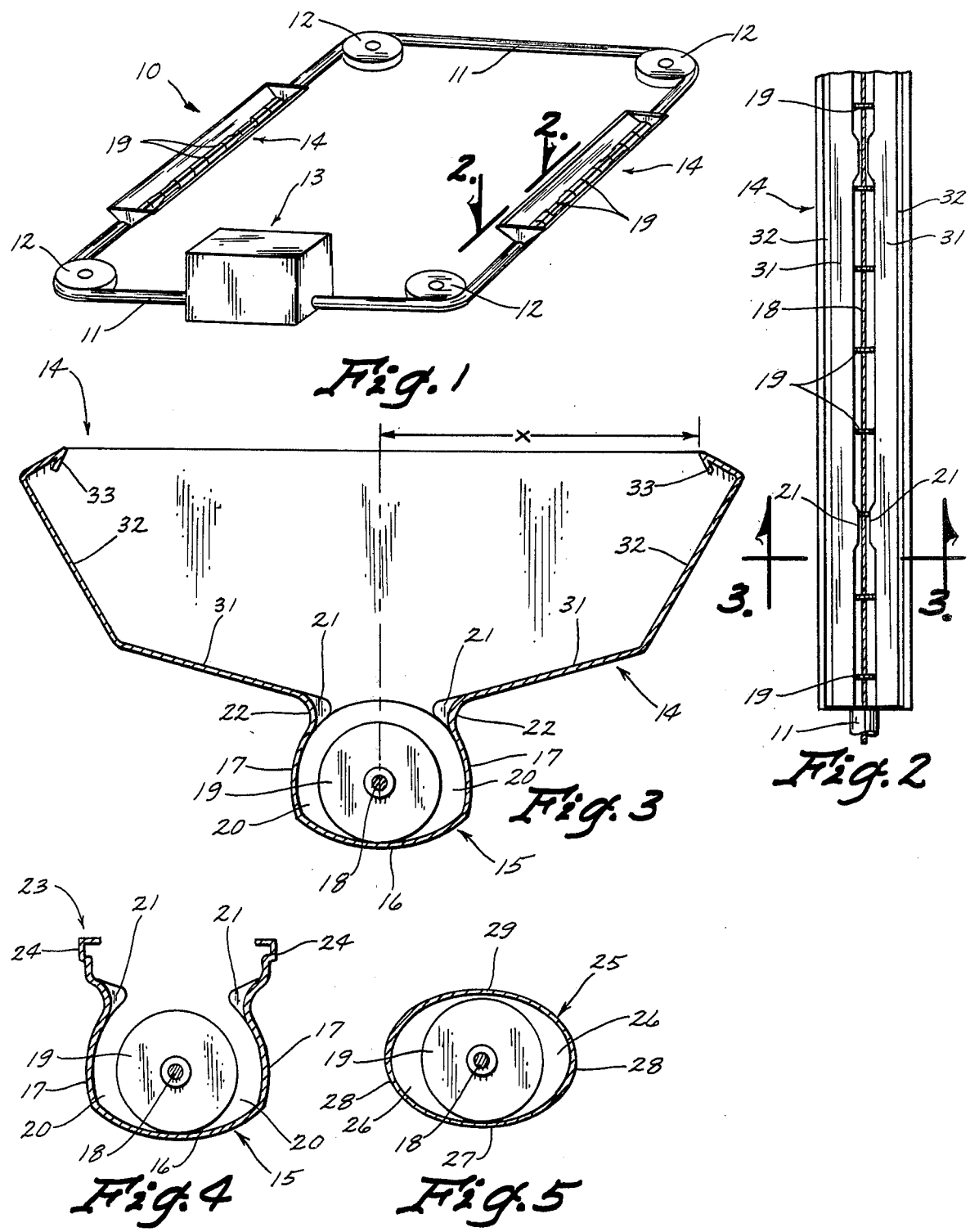

CABLE HOLD-DOWN APPARATUS

BACKGROUND OF THE INVENTION

The present invention relates generally to a conveyor system of a type having a channel for confining and conveying granular or powdery materials and having a flexible member disposed therein which is moveable within the channel, and more particularly to a hold-down apparatus for holding the flexible conveyor member down within the material to be conveyed.

In the type of conveyor system referred to above, there exists a general problem that when the material being conveyed gets slightly moist or tends to stick together for any reason, the flexible conveyor member, riding in the channel, tends to be pushed upwardly and rides over the top of such material which is sticking together, thereby leaving it behind and tending to allow it to build up. This buildup of material then tends to cause problems because it quite often will spoil, if it is an organic type of material such as poultry feed or the like. One solution in the prior art to this problem has been to merely make the channel smaller. In the type of conveyors having a tube for a channel, smaller tubes have been used to prevent the cable with the inserts thereon from riding up over certain matted material, but the problem with this approach has been that when the cable and inserts go through the channel to complete the circuit necessary for operation, there becomes an unacceptable amount of friction and quite often the drive unit is unable to pull the cable through the tube or channel. Even if a large enough drive unit is used, inordinate wear results from such an arrangement. Consequently, it is apparent that there is a need for structures which will overcome the problem of the cable riding up over the material which is tending to stick together or adhere to the bottom of the channel or tube, while at the same time to overcome the frictional problems associated with prior art attempts to overcome this problem.

A still further problem in the above-identified conveying art is encountered when this type of conveying system is utilized for feeding poultry or the like within a poultry house. Typically, a poultry feeding conveyor apparatus of this type would have a circuitous tube or channel having a cable with inserts therein disposed around through the circuitous channel or tube. There would, of course, be a typical drive unit attached thereto, for pulling the cable through the channel or tube, a hopper for introducing poultry feed into the conveyor system and a structure at each cage for distributing feed to each cage for feeding the birds therewith.

There are numerous poultry feeding troughs which have been utilized in connection with such a system, and one of such poultry feeding troughs is shown in U.S. Pat. No. 4,207,838. This patent shows a structure wherein a portion of the channel or tubular structure for conveying the poultry feed is substantially open at the top, thereby having the cable with the inserts thereon exposed and allowing the birds to feed directly therefrom. The walls of the channel are extended upwardly and outwardly at this point to provide for catching poultry feed which drops out of the mouth of the poultry or which is caused to be thrown out of the bottom of the channel structure during the bird's eating process. In the above-mentioned patent, a special wire hold-down apparatus is attached at spaced intervals along the open feeding trough for holding the cable and inserts down into and near the bottom of the channel structure, while at the same time providing an open space for the birds to feed. One problem associated with this structure is the special and additional welding, soldering, riveting or the like which is necessary, and the additional manufacturing costs due to this labor and materials, as well as the forming cost of the wire member that is attached thereto.

Still another problem associated with the structure shown in the above-identified patent is that once the birds have eaten all of the poultry feed out of the conveyor and become hungry, they are extremely anxious to begin eating again from the trough, as would be expected. Consequently, when the cable with the inserts thereon is turned on to pull more feed around and to each cage for feeding, the poultry immediately begin to eat from the troughs during that time in which the cable and inserts are moving. Consequently, there is a great danger that if the poultry are feeding at the same time that the conveying structure is running, the poultry will catch their beaks between one or more of the circular members attached to the cable and the hold-down structure, thereby pulling the beak off of the bird or causing the bird such serious injury to its beak that it can no longer eat and will therefore die of starvation.

Consequently, there is clearly a need for structures which will overcome the above-identified deficiencies of the prior art, such as overcoming the need for expensive and time consuming hold-down structures and also eliminating the danger of pulling the beaks off of poultry, while at the same time accomplishing the desired hold-down function.

SUMMARY OF THE INVENTION

The present invention relates to a conveying system of a type including a flexible endless member, circular material engaging inserts disposed on the flexible endless member for catching material and moving the material in reponse to movement of the endless flexible member and the material engaging inserts. A channel is disposed at least partially around the flexible endless member and the material engaging inserts for confining material for transportation from place to place. A drive unit is provided for selectively causing the flexible endless member to be pulled through the channel. The channel has a pair of opposed sidewalls, a bottom wall and structure integrally formed in and connected to an upper portion of the pair of opposed sidewalls for holding the circular material engaging inserts and the flexible endless member in the channel.

An object of the present invention is to provide an improved hold-down apparatus for conveyors of the type generally referred to above.

Another object of the invention is to provide a cable hold-down apparatus which causes all of the material to be conveyed to actually be conveyed and eliminating the problem of the cable or other equivalent structure riding up over certain material which has stuck together.

A further object of the invention is to provide the above identified hold-down structure, while also eliminating the problem of having an inordinate amount of friction associated with the solution of the hold-down problem.

Still another object of the invention is to provide an improved feeding trough structure for poultry.

Still another object of the invention is to provide a feeding trough structure for poultry which is cheap and economical to manufacture, while being dependable and reliable in its use.

A still further object of the invention is to provide a feeding trough for use in a conveyor system of the type generally referred to above which eliminates a sometimes present danger of similar systems which tend to damage the beaks of poultry or cause the beaks to be pulled off.

Other objects, advantages, and novel features of the present invention will be apparent from the following detailed description of the invention when considered in conjunction with the accompanying drawings.

BRIEF DESCRIPTION OF THE DRAWINGS

FIG. 1 shows a perspective view of one embodiment of the present invention, including a circuitous tube or channel structure for conveying poultry feed, a drive unit for pulling a cable with inserts thereon, or equivalent structures, through the circuitous channel or tube and additionally having the novel feeding trough of the present invention shown thereon for feeding poultry therefrom;

FIG. 2 is an enlarged partial view of the feeding trough of FIG. 1, taken along 2—2 of FIG. 1;

FIG. 3 is a cross-sectional view taken along line 3—3 of FIG. 2;

FIG. 4 is a cross-sectional view of a second embodiment of the present invention showing a channel means having the novel hold-down structure attached thereto; and FIG. 5 is a cross-sectional view of a third embodiment of the present invention.

DESCRIPTION OF THE PREFERRED EMBODIMENTS

Referring now to the drawings wherein like reference numerals designate identical or corresponding parts throughout the several views, FIG. 1 shows a schematic view of a cable conveying system 10 constructed in accordance with the present invention. In general what is shown in FIG. 1 is a circuitous tube-like structure 11 having conventional idler-type corner structures 12 attached thereto for reducing friction for going around such corners, a combination drive unit and hopper unit 13 for pulling the cable with inserts thereon around and through the system, and also for introducing granular or powdery materials, such as poultry food, into the system. Typically the drive unit and hopper until are separate, but since they form no part of this invention, they are shown schematically as one unit. A cage feeding trough 14 is disposed within the system for the purpose of feeding poultry.

Referring now to FIGS. 2 and 3, the poultry feeding trough 14 can be seen in more detail. Looking to FIG. 3, it is noted that a channel 15 is formed. This channel 15 has a bottom wall 16 and side walls 17. An endless cable 18 is disposed within the channel 15 and has a plurality of circular material engaging inserts 19 which are rigidly attached to cable 18 at evenly spaced intervals. Typically, these material engaging inserts are made of nylon or some other type of wear-resistant plastic material. It should be noted, however, that other types of endless conveyor structures can be used. It is also noted that there is a space 20 provided on the sides each of the material engaging inserts 19 for the purpose of reducing friction, a problem which is very crucial at the points where the cable goes around the corner structures 12.

Hold-down nodules 21 are integrally formed into the cage feeding trough 14 during the sheet metal forming process, and these nodules 21 extend inwardly beyond the point 22 of the cage feeding trough 14, and just above the channel portion 15 thereof at the top of the side walls 17. These hold-down nodules 21 are spaced along the length of the cage feeding trough 14 by whatever distance is necessary to properly hold the cable and inserts 18 and 19 respectively in the channel 15 to ensure that it does not ride up over the feed which becomes packed, for example, due to becoming wet. While at the same time holding the cable 18 and inserts 19 downwardly to the extent desired, the nodules 21 are spaced apart sufficiently such that poultry feeding from the trough 14 will have a wide space between the portion of the upstanding walls 17 of the channel 15; that is, between portions 22 in which to feed for most of the length of the feeding trough 14. These nodules 21 are smooth on each end thereof because they have formed in the material of cage trough 14 by merely pushing in the sheet metal material at the point 22 at intervals along the length of the feeding trough 14. Actually these nodules 21 can be formed at any time during the forming process. For example, they may be formed when the sheet metal is flat, or they may be formed at a later time when the rest of the bending process is accomplished. Typically, the trough is constructed of a sheet of metal such as galvanized steel. It is to be understood, however, that other equivalent structural materials may be used to form this structure.

The distance, x, between portion 33 of the feed trough 14 and the longitudinal center of the feed through 14 is made large enough so that poultry can easily reach the feed within the channel 15, but far enough to catch feed falling from the poultry's beaks. Additionally, this space is made wide, having a distance of twice the distance x, so as to catch feed which is thrown around by poultry which are pecking at the feed in the channel 15 with their beaks.

Referring now to FIG. 4, a second embodiment 23 is shown. This embodiment 23 is equivalent to the tubular portion 11 shown in FIG. 1, since it is common to use an open type of channel rather than the also conventional one having a circular cross-sectional shape. The FIG. 4 embodiment is essentially the same as the embodiment shown in FIGS. 1-3, except that it is not a feed trough, but instead is merely a conveyor channel. Consequently, all of the elements of the FIG. 4 embodiment are the same as that shown in FIG. 3, except for a top portion 24 which is merely of a shape in order to receive an optional cover plate. Such a cover plate (not shown) can optionally be placed over the top of portion 24, and then removed when desired in order to inspect the cable system at any particular place.

In like fashion, the hold-down nodule structures 21 keep the inserts 19 down towards the bottom 16 of the channel 15, while at the same time provide for only a minimum amount of friction against the top of the inserts 19, because there are only few of these hold-down nodules 21. The spaces 20, provided at the sides, allow for material to accumulate somewhat at the sides and not overwork the system or cause excessive friction; and, furthermore this feed will, by gravity, drop downwardly and be carried by the conveyor system when the conveyor system becomes more emptied.

Referring now to the embodiment of FIG. 5, it is noted that one of the most common types of channel structures for providing a complete circuit for the above-identified type of conveying system is the use of tubes having a circular cross-sectional shape. As mentioned above, however, it has been determined that in order to prevent inserts and cables from riding up over material in certain instances, smaller tubes need to be used. But the problem with the use of a smaller circular tube is that too much friction occurs at the corners 12. Consequently, FIG. 5 shows an embodiment 25, having spaces 26 at each side thereof. A bottom 27 is provided, and sidewalls 28 are spaced outwardly from the inserts 19. A top wall 29 is also provided as a hold-down extension of the side walls 28. Consequently, the embodiment of FIG. 5 solves the problem of holding the cable 18 and inserts 19 down to prevent them from riding up over material within the tube 25, while at the same time overcoming the frictional problem by providing a space 26 at the sides thereof for allowing feed to accumulate and reducing the friction problem associated with smaller circular transporting tubes or channels.

Obviously many modifications and variations of the present invention are possible in light of the above teaching. It is therefore to be understood that, within the scope of the appended claims, this invention may be practiced otherwise than as specifically described.

We claim:

1. In a conveying apparatus of a type including a flexible endless member, circular material engaging means disposed on said flexible endless member for catching material and moving the material in response to movement of the endless flexible member and said material engaging means, a plurality of sections of channel means disposed at least partially around said flexible endless member and said material engaging means for confining material for transportation from place to place, means for selectively causing said flexible endless member to be pulled said channel means, an improvement comprising:

said channel means having a pair of opposed side walls, a bottom wall and hold-down means integrally formed in and connected to an upper portion of said pair of opposed side walls and formed at intervals along and in said side walls for holding said circular material engaging means and said flexible endless member in said channel means, each of the sections of said channel means and hold-down means being formed of one single piece of metal;

said channel means being comprised of sheet metal and said hold-down means being comprised of a pair of opposed indentations inwardly extending towards each other in the upper walls of said channel means said indentations being spaced at intervals along the length of said channel means.

2. Apparatus as defined in claim 1 including trough means attached to the upper portion of said pair of opposed side walls, said trough means including a pair of opposite walls extending upwardly and outwardly from said channel means for preventing feed loss when poultry are feeding from said channel means.

3. Apparatus as defined in claim 1 including means attached to the upper portion of said pair of opposed side walls for receiving a cover for the channel means.

4. Apparatus as defined in claim 1 wherein the distance between the sides of the material engaging means and the side walls being substantially greater than the distance between the top of the material engaging means and the top of the channel means and greater than the distance between the bottom of the material engaging means and the bottom of the channel means, whereby the material engaging means are held downwardly and frictional problems are overcome.

5. Apparatus as defined in claim 4 wherein said channel means is substantially elliptical in cross-sectional shape.

* * * * *